June 24, 1930.　　　A. LANSER　　　1,766,133
LIQUID FUEL APPARATUS
Filed Aug. 10, 1929
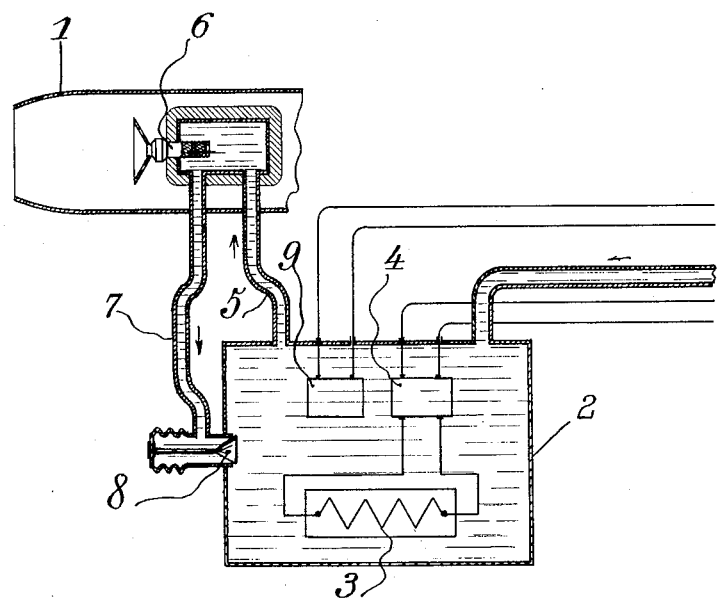
Inventor:
Alfred Lanser
By
Louis Barnett,
Attorney.

Patented June 24, 1930

1,766,133

UNITED STATES PATENT OFFICE

ALFRED LANSER, OF CORSEAUX-VEVEY, SWITZERLAND

LIQUID-FUEL APPARATUS

Application filed August 10, 1929. Serial No. 385,033.

My invention relates to heating installations utilizing liquid combustibles and particularly heavy oils.

The invention has for an object to improve installations of the type indicated so that they operate in a way superior to those known in the prior art.

The invention consists essentially with a view to preventing the operation of the atomizer and consequently the burner except when the combustible has been transformed into a state which produces the best spray thereof and hence perfect operation of the burner and at the same time to have recourse to a heating means for the said combustible controlled by a thermostatic apparatus, in providing the atomizer with a means such as a by-pass and to control said by-pass by an element subjected to the pressure existing in the feeding zone of the atomizer and subjecting to the control of a thermostat placed under the influence of the temperature of the combustible in the said feeding zone, the elements, such as pumps, assuring the feeding in combustible to the burner in question.

My invention will be more readily understood by those skilled in the art in the following description when taken in connection with the accompanying drawing forming part of this specification and in which the single figure represents a diagrammatic sectional view of my apparatus.

In the drawing 1 represents a burner and 2 a supply tank for fuel. I dispose in the fuel tank 2 a heating means such as an electrical resistance 3 and I control said electrical resistance 3 with a thermostat 4 placing said electrical resistance in circuit when the combustible contained in the fuel tank is not at a predetermined temperature which is the temperature for which the said thermostat has been regulated and places the said resistance 3 out of circuit when said predetermined temperature has been attained.

In addition to the normal feed pipe 5 of the atomizer 6 of the burner 1 leading to the fuel tank 2 I utilize a conduit 7 placing the said atomizer 6 also in communication with the fuel tank 2 as shown and I control the opening in said conduit 7 at the fuel tank end by means of a check valve 8 adapted to respond to the pressure existing in conduit 7, atomizer 6, conduit 5 and fuel tank 2.

I dispose in the fuel tank 2 a thermostat 9 opening the circuit to one or more motors actuating the one or more pumps pumping the combustible under pressure into the fuel tank 2.

I preferably heat insulate the atomizer 6 or at least the rear part thereof.

The operation of my apparatus takes place as follows:

Suppose that it is desired to feed the burner 1 with fuel oil which, as is known in the art, has a certain viscosity when cold and consequently is atomized only with difficulty, and suppose it is desired to render the combustible in question completely atomizable, and consequently bring the same to a temperature which gives it the indispensable fluidity for a proper atomization, I regulate the thermostat 9 for the particular temperature desired.

If all operates as desired, that is to say, if the combustible arrives at the burner at the predetermined temperature the check 8 is on its seat and the atomizer 6 is fed normally. If for some reason the temperature of the combustible falls, the thermostat 9 opens the circuit to one or more of the motors actuating the one or more pumps feeding the fuel tank 2 with combustible under pressure.

The pressure in the system falls which system comprises the fuel tank 2, the conduit 5, the atomizer 6 the conduit 7, the check 8 opens the end of said conduit 7 and places thus the atomizer in short circuit. The resistance 3 becomes hot and heats the combustible which rises in the conduit 5, passes through the atomizer 6 and by a thermosiphon effect if everything is in order returns to the fuel tank 2 and so on so long as the combustible has not attained the desired temperature. When said temperature is attained the thermostat 9 replaces in circuit the one or more motors actuating the pumps and the pressure existing anew the check 8 falls back on its seat, closes the conduit 7 and the atomizer is suitably fed.

My invention thus prevents flooding of the heating installation which takes place when the atomizer cannot operate properly due to a lack of fluidity to the proper degree of the combustible with which it is fed.

Having described my invention what I claim as new and desire to secure by Letters Patent is—

1. A heating installation for liquid combustibles having a fuel tank, a burner, an atomizer in said burner, and a feed pipe for said fuel tank, the combination of a pair of conduits interconnecting said burner and said fuel tank, pressure responsive means for closing one of said conduits, heating means disposed in said fuel tank, temperature responsive means in said fuel tank adapted to control said heating means and temperature responsive means disposed in said fuel tank adapted to control the supply of combustible through said feed pipe.

2. A heating installation for liquid combustibles having a fuel tank, a burner, an atomizer in said burner, and a feed pipe for said fuel tank, the combination of a pair of conduits interconnecting said burner and said fuel tank, pressure responsive means for closing one of said conduits, an electrical resistance for heating disposed in said fuel tank, a thermostat in said fuel tank adapted to control said heating resistance and temperature responsive means disposed in said fuel tank adapted to control the supply of combustible through said feed pipe.

3. A heating installation for liquid combustibles having a fuel tank, a burner, an atomizer in said burner, and a feed pipe for said fuel tank, the combination of a pair of conduits interconnecting said burner and said fuel tank, pressure responsive means for closing one of said conduits, heating means disposed in said fuel tank, temperature responsive means in said fuel tank adapted to control said heating means and a thermostat disposed in said fuel tank adapted to control the supply of combustible through said feed pipe.

4. A heating installation for liquid combustibles having a fuel tank, a burner, an atomizer in said burner, and a feed pipe for said fuel tank, the combination of a pair of conduits interconnecting said burner and said fuel tank, pressure responsive means for closing one of said conduits, an electrical resistance for heating disposed in said fuel tank, a thermostat in said fuel tank adapted to control said heating resistance and a thermostat in said fuel tank adapted to control the supply of combustible through said feed pipe.

5. A heating installation for liquid combustibles having a fuel tank, a burner, an atomizer in said burner, and a feed pipe for said fuel tank, the combination of a pair of conduits interconnecting said burner and said fuel tank, a pressure responsive check valve for closing one of said conduits, heating means disposed in said fuel tank, temperature responsive means in said fuel tank adapted to control said heating means and temperature responsive means disposed in said fuel tank adapted to control the supply of combustible through said feed pipe.

6. A heating installation for liquid combustibles having a fuel tank, a burner, an atomizer in said burner, and a feed pipe for said fuel tank, the combination of a pair of conduits interconnecting said burner and said fuel tank, a pressure responsive check valve for closing one of said conduits, an electrical resistance for heating disposed in said fuel tank, a thermostat in said fuel tank adapted to control said heating resistance and temperature responsive means disposed in said fuel tank adapted to control the supply of combustible through said feed pipe.

7. A heating installation for liquid combustibles having a fuel tank, a burner, an atomizer in said burner, and a feed pipe for said fuel tank, the combination of a pair of conduits interconnecting said burner and said fuel tank, a pressure responsive check valve for closing one of said conduits, heating means disposed in said fuel tank, temperature responsive means in said fuel tank adapted to control said heating means and a thermostat disposed in said fuel tank adapted to control the supply of combustible through said feed pipe.

8. A heating installation for liquid combustibles having a fuel tank, a burner, an atomizer in said burner, and a feed pipe for said fuel tank, the combination of a pair of conduits interconnecting said burner and said fuel tank, a pressure responsive check valve for closing one of said conduits, an electrical resistance for heating disposed in said fuel tank, a thermostat in said fuel tank adapted to control said heating resistance and a thermostat in said fuel tank adapted to control the supply of combustible through said feed pipe.

In testimony whereof I have affixed my signature.

ALFRED LANSER.